United States Patent
Swaminathan et al.

(10) Patent No.: US 12,147,495 B2
(45) Date of Patent: Nov. 19, 2024

(54) ROBUST CONTENT FINGERPRINTING FOR IMAGE ATTRIBUTION

(71) Applicant: ADOBE INC., San Jose, CA (US)

(72) Inventors: Viswanathan Swaminathan, Saratoga, CA (US); John Philip Collomosse, Surrey (GB); Eric Nguyen, San Jose, CA (US)

(73) Assignee: ADOBE INC., San Jose, CA (US)

( * ) Notice: Subject to any disclaimer, the term of this patent is extended or adjusted under 35 U.S.C. 154(b) by 467 days.

(21) Appl. No.: 17/142,030

(22) Filed: Jan. 5, 2021

(65) Prior Publication Data

US 2022/0215205 A1    Jul. 7, 2022

(51) Int. Cl.
| | |
|---|---|
| *G06F 18/214* | (2023.01) |
| *G06F 16/532* | (2019.01) |
| *G06F 16/583* | (2019.01) |
| *G06F 18/213* | (2023.01) |
| *G06N 20/00* | (2019.01) |
| *G06T 7/60* | (2017.01) |
| *G06V 10/40* | (2022.01) |
| *G06V 20/00* | (2022.01) |

(52) U.S. Cl.
CPC .......... *G06F 18/214* (2023.01); *G06F 16/532* (2019.01); *G06F 16/583* (2019.01); *G06N 20/00* (2019.01); *G06T 7/60* (2013.01); *G06V 10/40* (2022.01); *G06V 20/00* (2022.01); *G06T 2207/20081* (2013.01)

(58) Field of Classification Search
CPC .... G06F 18/214; G06F 16/532; G06F 16/583; G06F 18/213; G06N 20/00; G06N 3/045; G06N 3/084; G06T 7/60; G06T 2207/20081; G06T 2201/0201; G06V 10/40; G06V 10/82; G06V 20/00
See application file for complete search history.

(56) References Cited

PUBLICATIONS

"Apurva Gandhi et. al., Adversarial Perturbations Fool Deepfake Detectors, Sep. 2020, Electronic ISBN:978-1-7281-6926-2, IEEE 2020, 2161-4393" (Year: 2020).*
"Subarna Tripathi et. al., Compact Scene Graphs for Layout Composition and Patch Retrieval, 2019, IEEE/CVF Conference on Computer Vision and Pattern Recognition (CVPR) Workshops, 2019, pp. 0-0" (Year: 2019).*

(Continued)

*Primary Examiner* — Andrae S Allison
*Assistant Examiner* — Phuong Hau Cai
(74) *Attorney, Agent, or Firm* — Shook, Hardy & Bacon L.L.P.

(57) ABSTRACT

A visual search system facilitates retrieval of provenance information using a machine learning model to generate content fingerprints that are invariant to benign transformations while being sensitive to manipulations. The machine learning model is trained on a training image dataset that includes original images, benign transformed variants of the original images, and manipulated variants of the original images. A loss function is used to train the machine learning model to minimize distances in an embedding space between benign transformed variants and their corresponding original images and increase distances between the manipulated variants and their corresponding original images.

20 Claims, 7 Drawing Sheets
(2 of 7 Drawing Sheet(s) Filed in Color)

(56) References Cited

PUBLICATIONS

"Arnold W.M. Smeulders et al., Content-Based Image Retrieval at the End of the Early Years, Dec. 2000, IEEE Transactions on Pattern Analysis and Machine Intelligence, vol. 22, No. 12, 1349-1380" (Year: 2000).*

"Christoph Zauner, Implementation and Benchmarking of Perceptual Image Hash Functions, 2010, eingereicht am Fachhochschul-Masterstudiengang Sichere Informationssysteme in Hagenberg" (Year: 2010).*

"Hongmin Liu et. al., Towards Learning Line Descriptors from Patches: a New Paradigm and Large-Scale Dataset, Sep. 2020, Springer-Verlag GmbH Germany, part of Springer Nature 2020" (Year: 2020).*

"Florian Schroff et. al., FaceNet: A Unified Embedding for Face Recognition and Clustering, Proceedings of the IEEE Conference on Computer Vision and Pattern Recognition CVPR, 2015, pp. 815-823" (Year: 2015).*

"Yuval Nirkin et. al., Face-Specific Data Augmentation for Unconstrained Face Recognition, International Journal of Computer Vision, 2019, 127:642-667" (Year: 2019).*

"Carl Doersch et. al., Cross Transformers: spatially-aware few-shot transfer, Dec. 2020, Proceedings of the 34th International Conference on Neural Information Processing Systems, Article No. 1844, pp. 21981-21993" (Year: 2020).*

Ashual, O. and Wolf, L. "Specifying Object Attributes and Relations in Interactive Scene Generation", In Proceedings of the IEEE International Conference on Computer Vision, pp. 4561-4569 (2019).

Bela, G., et al., "Securing Video Integrity Using Decentralized Trusted Timestamping on the Bitcoin Blockchain", Tenth Mediterranean Conference on Information Systems (MCIS), pp. 1-10 (2016).

Bronstein, M. M., et al., "Geometric deep learning: going beyond Euclidean data", IEEE Signal Processing Magazine, pp. 1-22 (2017).

Bui, T., et al., "Compact Descriptors for Sketch-based Image Retrieval using a Triplet loss Convolutional Neural Network", Computer Vision and Image Understanding, pp. 1-17 (2017).

Bui, T., et al., "Archangel: Tamper-proofing Video Archives using Temporal Content Hashes on the Blockchain", In Proceedings of the IEEE Conference on Computer Vision, pp. 9 (2019).

Cao, Z., et al., "HashNet: Deep Learning to Hash by Continuation", In Proceedings of the IEEE international conference on computer vision, pp. 5608-5617 (2017).

Collomosse, J., et al., "Archangel: Trusted Archives of Digital Public Documents", ACM Symposium on Document Engineering, pp. 4 (Aug. 2018).

Chen, J., et al., "FastGCN: Fast Learning With Graph Convolutional Networks via Importance Sampling", arXiv:1801.10247v1, ICLR, pp. 1-15 (2018).

Finley, K., "Facebook, Microsoft Back Contest to Better Detect Deepfakes", Retrieved from Internet URL:https://www.wired.com/story/facebook-microsoft-contest-better-detect-deepfakes/, accessed on Apr. 5, 2021, pp. 5 (Sep. 5, 2019).

Gao, J., et al., "DSH: Data Sensitive Hashing for High-Dimensional k-NN Search", SIGMOD, pp. 1127-1138 (Jun. 2014).

Gordo, A., et al., "Deep Image Retrieval: Learning Global Representations for Image Search", In European conference on computer vision, pp. 241-257 (2016).

Guo, M., et al., "Neural Graph Matching Networks for Fewshot 3D Action Recognition", In Proceedings of the European conference on computer vision (ECCV), pp. 1-17 (2018).

Gu, J., et al., "Unpaired Image Captioning via Scene Graph Alignments", In Proceedings of the IEEE International Conference on Computer Vision, pp. 10323-10332 (2019).

Gregory, S., "The Adobe Content Authenticity Initiative approach to authenticity infrastructure against media manipulation", Witness, Retrieved from Internet URL : https://blog.witness.org/2020/08/adobe-content-authenticity-initiative-approach-authenticity-infrastructure-media-manipulation/, accessed on Apr. 5, 2021, pp. 11.

Khan, N., et al., "Graph convolutional network for multi-label VHR remote sensing scene recognition", Neurocomputing, vol. 357, pp. 36-46 (2019).

Li, Y., et al., "In Ictu Oculi: Exposing AI Generated Fake Face Videos by Detecting Eye Blinking", arXiv:1806.02877v2, pp. 7 (2018).

Radenovic, F., et al., "CNN Image Retrieval Learns from BoW: Unsupervised Fine-Tuning with Hard Examples", European conference on computer vision, pp. 3-20 (2016).

Rosenthol, L., et al., "The Content Authenticity Initiative : Setting the Standard for Digital Content Attribution", Adobe Technical Report, pp. 1-28 (Aug. 2020).

Sangkloy, P., et al., "The Sketchy Database: Learning to Retrieve Badly Drawn Bunnies", ACM Transactions on Graphics, vol. 35, No. 4, Article 119, pp. 119:1-119:12 (Jul. 2016).

Schlichtkrull, M. et al., "Modeling Relational Data with Graph Convolutional Networks", arXiv:1703.06103v4, In European Semantic Web Conference, pp. 9 (2017).

Tripathi, S., et al., "Compact Scene Graphs for Layout Composition and Patch Retrieval", In Proceedings of the EEE Conference on Computer Vision, pp. pp. 8 (2019).

Wu, G., et al., "Unsupervised Deep Video Hashing with Balanced Rotation", Proceedings of the Twenty-Sixth International Joint Conference on Artificial Intelligence IJCAI, pp. 3076-3082 (2017).

Wang, S. Y., et al., "Detecting Photoshopped Faces by Scripting Photoshop", In Proceedings of the IEEE International Conference on Computer Vision, pp. 10072-10081 (2019).

Yu, Q., et al., "Sketch Me That Shoe", In Proceedings of the IEEE Conference on Computer Vision and Pattern Recognition, pp. 799-807 (2016).

Zauner, C., "Implementation and Benchmarking of Perceptual Image Hash Functions", Master's thesis, pp. 107 (2010).

Zhang, Z., et al., "Deep Learning on Graphs: A Survey", arXiv:1812.04202v2, pp. 1-23 (2019).

* cited by examiner

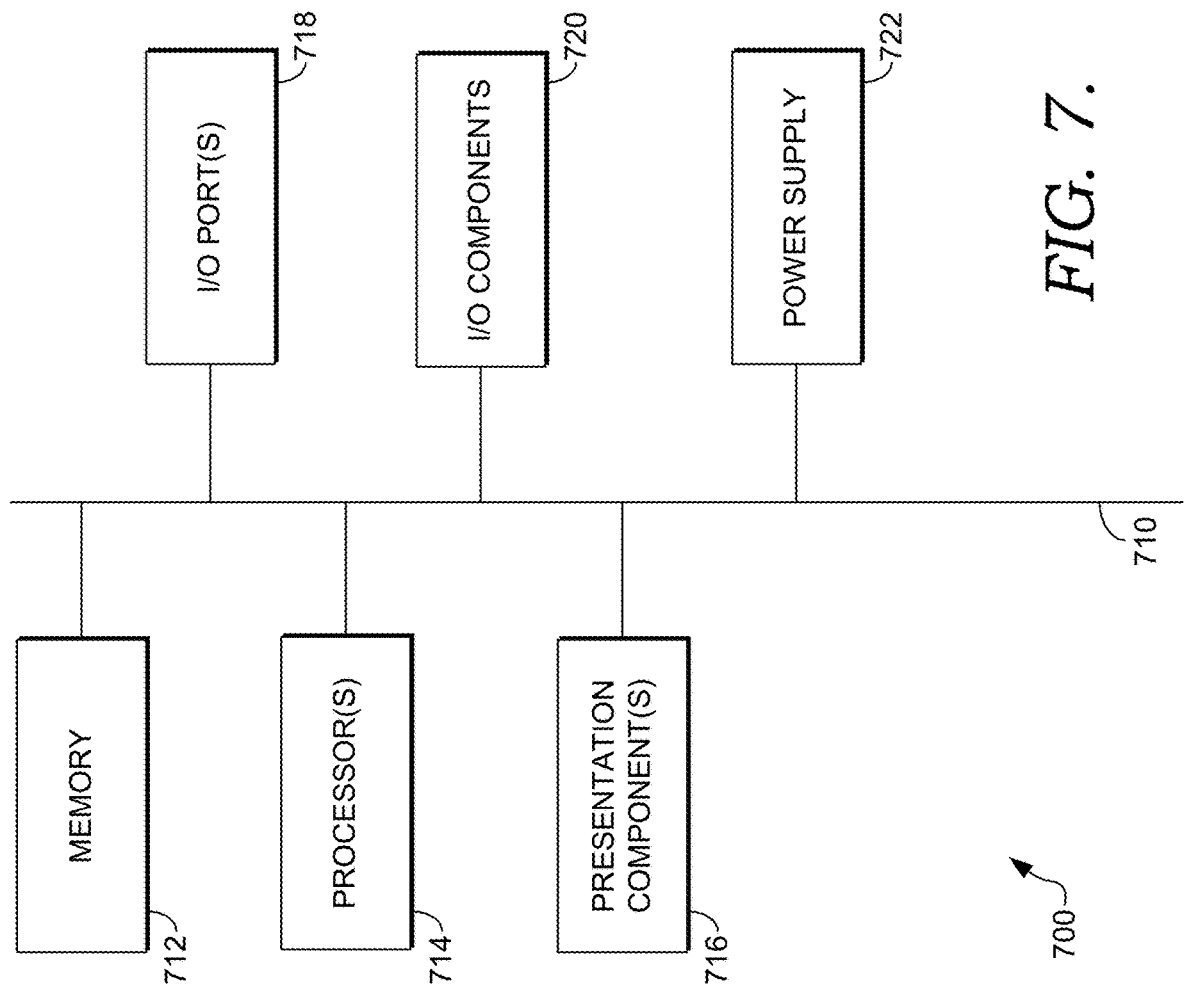

ROBUST CONTENT FINGERPRINTING FOR IMAGE ATTRIBUTION

BACKGROUND

The dissemination of fake news and misinformation is a centuries-old societal problem exacerbated by the digital age and social media. Today, images can be easily manipulated and shared widely. Emerging standards for image attribution, such as the Content Authenticity Initiative and ORIGIN, counter this problem by embedding cryptographically signed metadata in an image. The metadata contains provenance information such as authorship and the editing operations performed on it. The intent of the metadata is to provide additional information to improve awareness of the origins or "provenance" of content and help users make more informed decisions on whether to trust the media they encounter online.

Unfortunately, these emerging standards for image attribution provide only a partial solution since they are unable to trace image provenance when the metadata is removed from an image. This is a common occurrence when images are electronically distributed "in the wild." In some instances, metadata removal from images is incidental, such as when social media platforms strip out all metadata from images shared on their platforms. In other instances, metadata removal (or replacement) may be a deliberate act, for instance, when an image is intentionally manipulated to tell a different story.

SUMMARY

Embodiments of the present invention relate to, among other things, a visual search system that facilitates recovering provenance information for images shared online. The visual search system is capable of distinguishing between images that have benign transformations (e.g., transformations that are frequently applied when distributing images, such as cropping and resizing) and images that have been manipulated to alter the story told by the images (e.g., as in the case of fake news and misinformation). To facilitate this differentiation, the system employs content fingerprints that are invariant to benign transformations but sensitive to manipulations. More particularly, a machine learning model is trained using a training image dataset that includes original images, benign transformed variants of the original images, and manipulated variants of the original images. The machine learning model is also trained using a loss function that minimizes distances in an embedding space of the machine learning model between the original images and corresponding benign transformed variants while increasing distances in the embedding space between the original images and corresponding manipulated variants.

The trained machine learning model is used to generate content fingerprints of source images published by content creators, and each content fingerprint is stored in association with its corresponding source image (and associated metadata) in an image repository. When an image is encountered online, the image can be submitted to the visual search system as a query image. The visual search system feeds the query image to the machine learning model to generate a content fingerprint, which is used to query the image repository, and a response to the query is returned that may identify a source image with its associated provenance information.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is described in detail below with reference to the attached drawing figures, wherein:

FIG. 7 is a block diagram of an exemplary computing environment suitable for use in implementations of the present disclosure.

DETAILED DESCRIPTION

Definitions

Figure 1:
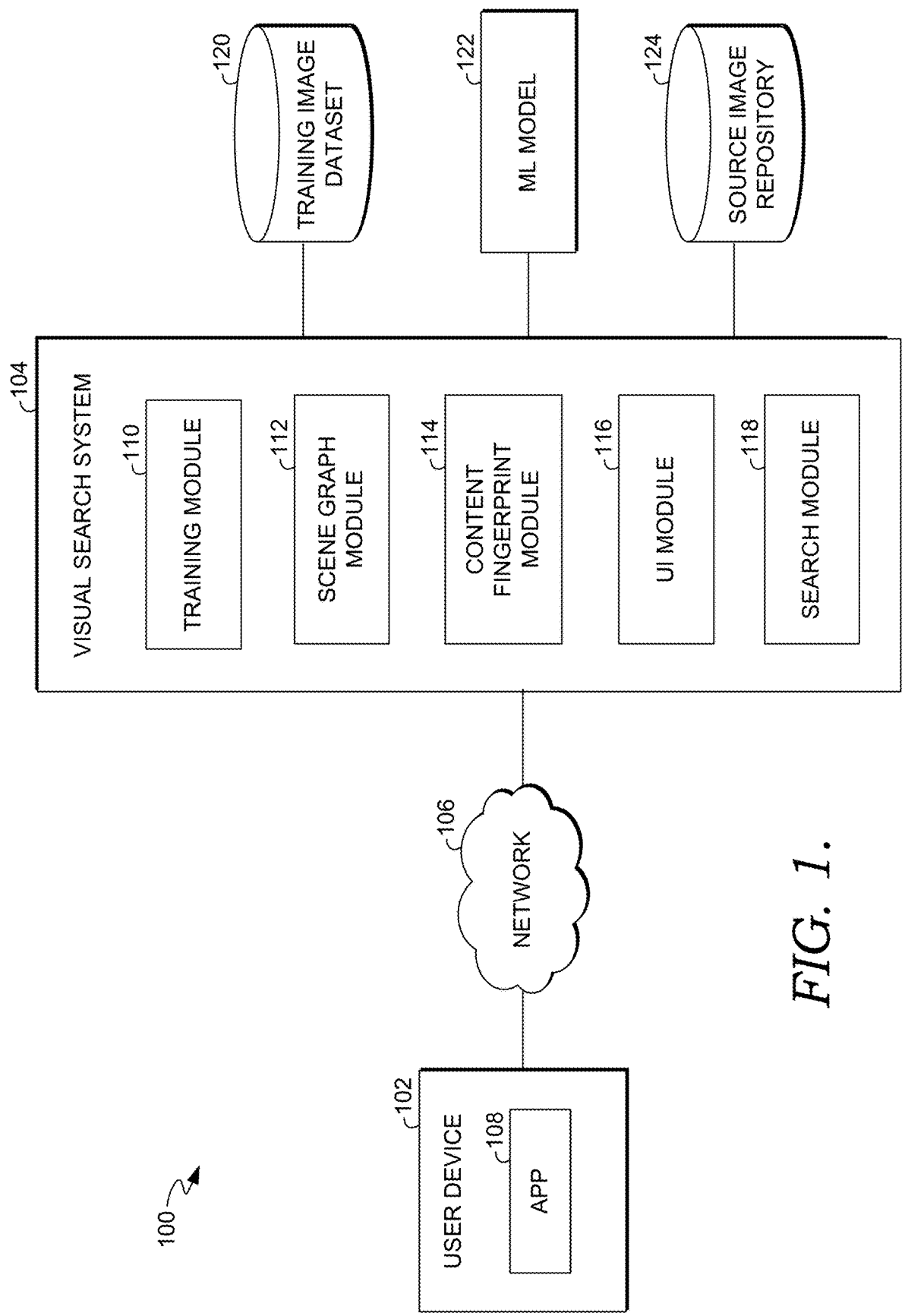
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, an "original image" refers to an image that serves as a baseline before any image transformations are applied to the image to produce manipulated and benign transformed variants for training purposes.

A "manipulated image" refers to a version of an image that has one or more manipulations applied to the image. A "manipulation" is an image transformation that changes salient visual details and impacts the meaning of the image or the story/message conveyed by the image. For example, the addition or removal of particular objects/motifs or alterations to salient visual details such as the face could substantially change the story told by an image. A manipulated image can include one or more benign transformations in addition to at least one manipulation.

A "benign transformed image" refers to a version of an image that has had one or more benign transformations applied to the image. A "benign transformation" is an image transformation that does not impact salient visual details to change the meaning of an image. By way of example only and not limitation, benign transformations may include transcoding, resolution change, padding, cropping, etc. Benign transformations are commonly applied to images as they are posted on websites or otherwise shared. A benign transformed image does not include any manipulations.

As used herein, a "content fingerprint" of an image is based on a representation of the image in an embedding space of a machine learning model (e.g., from the final embedding layer of the machine learning model). In accordance with the technology described herein, the machine learning model is trained using original images, manipulated images, and benign transformed images to encourage content fingerprints to exhibit both invariance to benign transformations and sensitivity to manipulations. The content fingerprint can take a number of forms, for instance, a real-valued vector (i.e. sequence of floating point numbers) or a more compact binary hash (i.e. a sequence of bits). In some instances, the approach described herein can be used to learn a content descriptor in the form of a real-valued vector. In some configurations, this vector may be converted to a binary hash using an auxiliary method such as product quantization (PQ) or end-to-end hashing, as described in further detail below.

An "image repository" refers to a repository of source images that can be searched using a visual search. A "source image" comprises an image provided by a content creator for storage in the image repository. A content fingerprint of each source image can be generated and stored in association with its corresponding source image. Other metadata, such as provenance data, can be stored in association with each source image. In some configurations, the image repository employ distributed ledger technology (DLT) (e.g., Blockchain). In such configurations, the provenance information for source images is stored within an immutable public distributed ledger, such as a Blockchain, for instance, in a 'key'-'value' store. The 'key' is the content fingerprinting e.g. 64 bit hash, and the 'value' is the provenance information e.g. as JSON string. In this manner, the provenance information for an image stripped of its metadata may be recovered by fingerprinting it and looking up the hash within the ledger key-value store. The advantage of this method is that DLT/Blockchain enables such a store to be maintained in a tamper-proof way without centralization. This contrasts with a centralized 'cloud' based lookup, in that it removes the burden of a single organization to host the repository of provenance information and may promote greater trust in the system also due to the lack of reliance on a single organization as a single source of truth to the public.

A "query image" refers to an image provided as a search query for performing a visual search of source images in an image repository.

A "scene graph representation" of an image refers to a representation of the image based on objects identified in the image and spatial relationships between objects in the image. The scene graph representation of an image can include any number of features regarding each object and each relationship between objects.

Overview

The ease with which images can be manipulated and widely distributed presents a particular challenge to thwarting fake news and misinformation. Emerging standards, such as the Content Authority Initiative and ORIGIN, attempt to combat this problem by embedding metadata with provenance information in images to allow users to discover the provenance of the image, such as authorship and editing operations performed on the image. However, these solutions fall short since the metadata can be stripped or replaced, thereby allowing the images to be manipulated and distributed without any provenance information or with altered metadata.

Embodiments of the present invention provide a solution to this problem by allowing provenance information to be recovered for an image encountered online. An image repository allows content creators to store source images with their associated metadata when the source images are published. Images encountered online by users can be submitted to query the image repository. When a query image is submitted, a content fingerprint of the query image is generated and used to query the image repository. This visual search enables, among other things, recovery and display of the source image's provenance information.

The content fingerprinting and visual search described herein have specific properties that make them robust for recovering provenance information for images encountered online. When images are distributed, users and social media platforms will often transform images into different quality, codecs, sizes, shapes, etc. These image transformations are referred to herein as "benign transformations" as they do not impact the story or meaning of the image but instead simply reformat the image. The technology described herein provides content fingerprints that are robust to such benign transformations to allow for images with benign transformations to be matched back to their corresponding source images. In other instances, images encountered online are manipulated to change the story or meaning of the images. These manipulated images should not match back exactly to the source images in the image repository. As such, the technology described herein provide content fingerprints that are sensitive to such manipulations.

In accordance with some aspects of the technology described herein, a machine learning model is trained to produce content fingerprints that are invariant to benign transformations while being sensitive to manipulations. The machine learning model is trained on images from a training image dataset, which includes original images, variants of the original images with benign transformations (i.e., benign transformed images), and variants of the original images with manipulations (i.e., manipulated images). The machine learning model is also trained using a loss function that minimizes the distance in an embedding space between original images and their corresponding benign transformed variants while increasing the distance between original images and their corresponding manipulated variants. For instance, deep metric learning techniques, such as triplet and contrastive learning can be employed to train the machine learning model. In some configurations, a global approach is taken in which a whole image is encoded by a machine learning model, such as a convolutional neural network. In other configurations, an object-centric approach is taken in which objects and relationships between the objects are extracted from images to generate a scene graph representation of the image that is encoded by a machine learning model, such as a graph convolutional network.

The technology described herein provides advantages over conventional visual search techniques within the context of retrieving image attribution information for distributed images. Existing hashes, such as MD5 or SHA-256, operate at the bit-level and are suitable for use in generating a content fingerprint only if image data is distributed without any change (e.g., in format, resolution, size, etc.). As noted above, however, images are often subject to benign transformations when distributed online, and the technology described herein provides content fingerprints that are invariant to such benign transformations. In contrast, existing cryptographic hash functions, such as MD5 or SHA-256, are unsuitable for adequately producing content fingerprints that are invariant to benign transformations.

As also noted above, the technology described herein provides content fingerprints that are sensitive to manipulations that may occur in the wild, where an image's content is altered—sometimes quite subtly—but sufficient to change its meaning. For example, the presence of particular objects or motifs or alteration to other salient visual details such as face, could substantially change the story told by an image. The technology described herein provides a different content fingerprint in the case of a manipulated image to cause either a failure or warning regarding the mismatch with the content fingerprint of the source image, in order to avoid corroborating the new story with the original provenance information. However, existing content fingerprinting technologies, such as perceptual hashing algorithms for images (e.g., pHash), often exhibit the opposite of these desirable properties—they are often invariant to minor changes in an image, and can be sensitive to common transformations (such as affine transformation or quality change) that are applied to images by major social platforms or users as they distribute content.

Example System for Content Fingerprinting and Visual Search

With reference now to the drawings, FIG. 1 is a block diagram illustrating an exemplary system for generating content fingerprints for images and using the content fingerprints for visual search in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and a visual search system 104. Each of the user device 102 and visual search system 104 shown in FIG. 1 can comprise one or more computer devices, such as the computing device 700 of FIG. 7, discussed below. As shown in FIG. 1, the user device 102 and the visual search system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and servers may be employed within the system 100 within the scope of the present invention. Each may comprise a single device or multiple devices cooperating in a distributed environment. For instance, the visual search system 104 could be provided by multiple server devices collectively providing the functionality of the visual search system 104 as described herein. Additionally, other components not shown may also be included within the network environment.

At a high level, the visual search system 104 trains a machine learning model 122 to generate content fingerprints for images to facilitate visual search of images in a source image repository 124. As shown in FIG. 1, the visual search system 104 includes a training module 110, a scene graph module 112, a content fingerprint module 114, a user interface (UI) module 116, and a search module 118. These components may be in addition to other components that provide further additional functions beyond the features described herein.

The visual search system 104 can be implemented using one or more server devices, one or more platforms with corresponding application programming interfaces, cloud infrastructure, and the like. While the visual search system 104 is shown separate from the user device 102 in the configuration of FIG. 1, it should be understood that in other configurations, some or all of the functions of the visual search system 104 can be provided on the user device 102.

Figure 2:
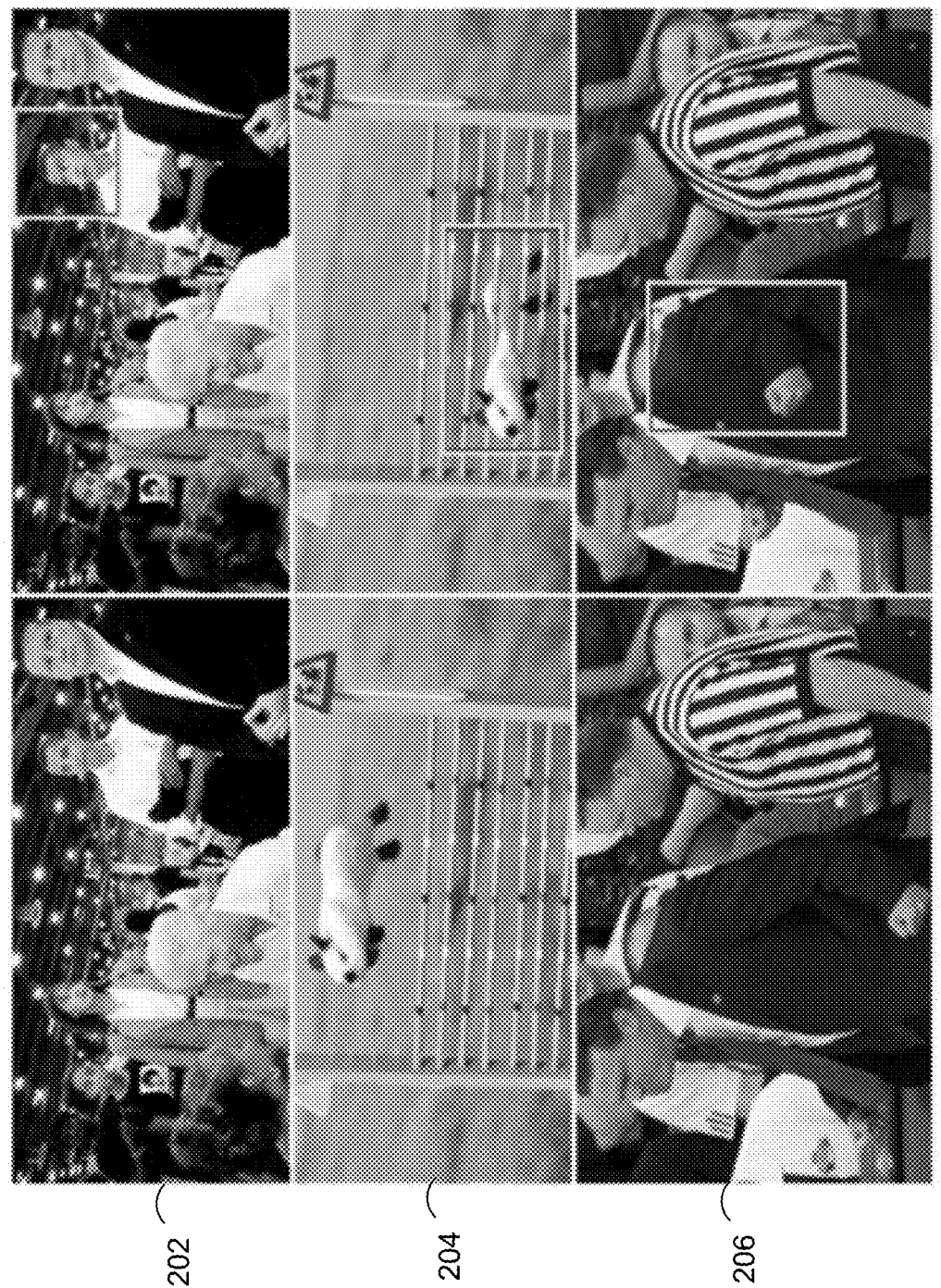
FIG. 2 includes images providing examples of manipulated variants of images.

The training module 110 trains a machine learning model 122 to generate content fingerprints for images. In accordance with the technology described herein, the machine learning model 122 is trained to be invariant to benign transformations but sensitive to manipulations. The training module 110 trains the machine learning module 120 using images from a training image dataset 120. The training image dataset 120 includes original images, manipulated images, and benign transformed images. Each benign transformed image comprises a version of an original image that has had one or more benign transformations applied to the original image. Each manipulated image comprises a version of an original image that has had one or more manipulations applied to the original image. FIG. 2 provides three examples 202, 204, and 206 of manipulated images and their corresponding original images.

By way of example only and not limitation, the machine learning module 110 can be trained and evaluated on a dataset of images manipulated in Adobe PHOTOSHOP, collected from user generated content on the web. This dataset could contain many thousands of original images, and for each of these original images, several user-contributed manipulated images with manipulations that change the story told by the original image. The manipulated images include, for instance, object removal/insertion, face editing/swap, and geometry change.

Benign transformed images are also created from each of these original images. In some configurations, the benign transformed images are created by applying a suite of primary and secondary benign transformations such as compression, padding, noise, resampling and affine transformation. By way of example only and not limitation, to ensure the machine learning model 122 is invariant to benign transformations, benign transformed images can be generated by applying a set of benign transformations (e.g., using OpenCV/PIL or any image processing library) to both the original images and manipulated images. In some configurations, two categories of benign transformations are applied: primary and secondary. In one particular configuration, the primary transformations (including random recompression and resize) can always be applied, while 1-3 secondary transforms can be randomly chosen and applied after the primary transforms. This reflects that images are commonly compressed and resized when redistributed online. For instance, the primary benign transformations could include: Recompression: JPEG quality [50; 90]%; Image resize: [0.6×-1.2×] uniform rescaling. The secondary benign transformations could include: Rotation [−25, 25] degrees; Flipping; Sharpness: range [0.25; 4.0] where values below 1 indicate decreased sharpness. Color Saturation: scaling range [0.5; 2.0]; Gaussian additive noise: kernel with mean 0 and a standard deviation in range [0.1; 1.1] (images are in normalized RGB space); Padding: black border added of width [1; 10]% of the shortest image side. It should be noted that the aforementioned approach for generating benign transformations is provided by way of example only and not limitation.

Global Approach. In some configurations, the training module 110 employs a global approach to train the machine learning model 122 to encode a whole image into an embedding space. For instance, the training module 110 can use deep metric learning to fine-tune existing retrieval embeddings to encourage invariance to benign transformations and sensitivity to manipulations as learned from the images in the training image dataset 120. By way of example only and not limitation, the training module 110 can use ResNet50 as a backbone, pre-trained using, for instance, ImageNet or using Adobe Stock tags.

Any number of deep metric learning techniques can be employed to train the machine learning model 122 on images from the training image dataset 120. In one configuration, a triplet/Siamese model is employed. A batch B of triplets (a, p, n) is formed, each comprising anchor (a), positive (p), negative (n) corresponding to an original image (a), a benign transformed variant of that original image (p), and a manipulated variant of that original image (n). In some cases, a negative image (n) can comprise another original image and/or a manipulated version of another original image. Writing the ResNet feed forward inference f(.), the machine learning model 122 can be trained using a loss function:

$$L_{tri}B = \sum_{(a,p,n) \in B} [m + |f(a) - f(p)|_2 - |f(n) - f(p)|_2]_+$$

In another configuration, the machine learning model 122 is trained using supervised contrastive learning. For instance, a supervised variant of SimCLR can be adapted to incorporate negatives (n) in addition to anchor (a) and positives (p). A minibatch B is formed by sampling an original image (a) and negative (n) images from manipulated variants of the original image. In some cases, the negative images (n) can include other original images and/or manipulated versions of other original images. During training, online data augmentation is performed by applying benign transformations to the original images to generate the positives (p). In some cases, several iterations (i) of positive augmentation are averaged. Each group of positives is referred to as G_i+ and negatives as G_i−. The machine learning model 122 is trained using the loss function:

$$L_{con}(B) = \sum L(i) \text{ where}$$

$$L(i) = -\log \sum_{p \in G_i^+} \frac{\exp(f(i) \cdot f(p)/\tau)}{\sum_{n \in G_i^-} \exp(f(i) \cdot f(n)/\tau)}$$

where τ is a temperature parameter, varied to aid the optimization as used in SimCLR.

Object-Centric Approach. In some configurations, the training module 110 employs an object-centric approach to train the machine learning model 122. Many manipulations involve tampering with objects, relationships between objects, or both. For instance, the examples in FIG. 2 illustrate tampering with objects in each image. Given this, an object-centric approach can be used to deconstruct each image into a scene graph representation that models objects and their spatial relationships in the image.

In accordance with one aspect of an object-centric approach, the scene graph module 112 takes an image x and generates a scene graph representation $\mathcal{G} = \{\mathcal{N}, E\}$ of the image where the node features N and edge features E hold the respective representations and pairwise relations of every object in the image. To build the scene graph representation $\mathcal{G}$, the scene graph module 112 decomposes the image into its constituent objects, for instance, using an object detector, such as Mask-RCNN. This results in a set of object crops $\{c_i\}$, its corresponding instance segmentation masks $\{m_i\}$ as well as bounding boxes $\{b_i=[x_i, y_i, h_i, w_i]\}$ characterized by the box center location $(x_i, y_i)$, and width/height $(h_i, w_i)$. In some configurations, the background is added as an 'object' with height and width of the full image x, obtained from the portion of the image that was not masked during instance segmentation.

The scene graph representation of an image can be encoded in a variety of different manners within the scope of the technology described herein. The following provides one way to define the node and relationship features. However, it should be understood that the node and relationship features may be defined in other manners.

Node features. In some aspects, three elements are used to construct the node features $\mathcal{N}$. The first element is a visual appearance feature $\{v_i\}$ extracted from the object crops. The other two elements, $\{s_i\}$ and $\{g_i\}$, are shape and geometry features computed from the segmentation masks and bounding boxes, respectively. Specifically, $$v_i = f^v(c_i); s_i = f^s(m_i); g_i = f^g(b_i),$$

where $f^v(.)$ is a CNN encoder; $f^s(.)$ is a shape extractor (e.g., using the 7 affine-invariant Hu moments for $f^s$) and $f^g(.)$ measures relative position of the detected objects with respect to the whole image. Given (h, w) the height/width of the input image and A=hw, $A_i=x_i y_i$ the areas of the image, and of the bounding boxes of detected object i, the geometry feature is computed from box coordinates:

$$g_i = f^g(b_i) := \left[\frac{x_i}{w}, \frac{y_i}{h}, \frac{w_i}{w}, \frac{h_i}{h}, \frac{A_i}{A}\right].$$

The node features are built by aggregating $v_i$, $s_i$, $g_i$:

$$\mathcal{N} : n_i = [E_v(v_i), E_s(s_i), E_g(g_i)].$$

where $E_v$, $E_s$, $E_g$ are fc layers for the visual, shape and geometry features respectively, and [,] is a concatenation.

Edge features. In some configurations, pairwise geometry relation is used for edge features. A connection between two objects i and j is encoded as follows:

$$\varepsilon : e_{ij} = [n_i, E_r(r_{ij}), n_j].$$

where $E_r$ is another linear fc projection and $r_{ij}$ represents the relative geometry between two object bounding boxes:

$$r_{ij} = \left[\frac{\Delta x}{\sqrt{A_i}}, \frac{\Delta y}{\sqrt{A_i}}, \frac{\sqrt{\Delta x^2 + \Delta y^2}}{\sqrt{w^2 + h^2}}, \frac{w_j}{w_i}, \frac{h_j}{h_i}, \theta_{ij}, \gamma_{ij}\right].$$

where transition $\Delta x = x_j - x_i$, $\Delta y = y_j - y_i$, box angle $\theta_{ij}$=arctan $(\Delta y/\Delta x)$ and standard Intersection over Union (IoU)

$$\gamma_{ij} = \frac{m_i \cup m_j}{m_i \cap m_j}.$$

All object pairings are encoded.

Graph convolutional network (GCN). In some configurations, the scene graph representation $\mathcal{G}$ is encoded via a graph convolutional network (GCN). The GCN can comprise, for instance, there components: a global CNN ($\mathcal{F}_G$, this could employ the same architecture as used in the global approach discussed above) for encoding image-level features and two CNN branches ($\mathcal{F}_V$, $\mathcal{F}_R$) to encode object-level visual features $\mathcal{N}$ and relation features ε respectively. $\mathcal{F}_V$ and $\mathcal{F}_R$ are fc layers followed by ReLU and batch normalization. Given input t:

$$\mathcal{F}_V(t)=BN(\max(0,W_v^T t+b_v)).$$

Similarly, $\mathcal{F}_R$, $\mathcal{F}_V$ and $\mathcal{F}_R$ output a sequence of object representations with same length as the input. To obtain a compact embedding a weighted pooling layer is appended via self-attention mechanism:

$$w = \sigma(\tanh(K^T t + b)V); P(t) = \sum_i w_i t_i \ldots$$

where σ is the softmax operation; K, b and V are learnable parameters. The above equation projects the input sequence t into a subspace where the importance of each component of t is measured via its similarity with a context vector V. The normalized result, w, is used to aggregate t to a single latent vector. The final embedding z is computed by passing the image x and its scene graph representation $\mathcal{G}$ to the 3 GCN branches:

$$z_c=\mathcal{F}_G(x); z_v=P_v(\mathcal{F}_V(\mathcal{N})); z_r=P_R(\mathcal{F}_R(\varepsilon))$$

$$z=E_b([z_c,z_v,z_r]).$$

where $E_b$ is a linear projection for a desired embedding dimension (e.g., 128-D for PQ hashing and 64-D for end-to-end hashed version; see the discussion below on fingerprint binarization for PQ and end-to-end hashing).

The trained machine learning model 122 can be employed to generate content fingerprints of images to facilitate visual search and image attribution. As shown in FIG. 1, the visual search system 104 includes an image repository 122. The image repository 122 stores source images provided by content creators of the source images, for instance, when the source images are published. The content fingerprint module 114 generates a content fingerprint for each source image in the image repository by feeding the source images to the trained machine learning module 120. The content fingerprint of each source image is stored in the image repository 122 in associated with its corresponding source image. The image repository 122 may store additional metadata, such as provenance information for each source image.

The content fingerprint of an image is based on a representation of the image in the embedding space of the machine learning model 122 (e.g., from the final embedding layer of the machine learning model). The content fingerprint can take a number of forms, for instance, a real-valued vector (i.e. sequence of floating point numbers) or a more compact binary hash (i.e. a sequence of bits). In some instances, the approach described herein can be used to learn a content descriptor in the form of a real-valued vector. In further instances, this vector may be converted to a binary hash. Hashing is helpful for scalable visual search. By way of example only and not limitation, two strategies to learn a binary embedding from the final embedding layer are described below.

A first strategy involves discretizing this layer during end-to-end training:

$$b=\mathrm{sign}(z)\in\{-1,1\}^D.$$

The hash code b now becomes a binary fingerprint of length D(D=64). In some configurations, the loss $\mathcal{L}_S(.)$ (e.g., from triplet ($L_{tri}$) or SimCLR ($L_{con}$)) regulates b through a buffer fc layer which serves two purposes: (i) converting b back to a continuous space where the cosine distance metric could operate effectively; and (ii) relaxing the backward gradient thus preventing information loss induced by $\mathcal{L}_S$ on b. A binary loss is enforced on z to reduce quantization error:

$$\mathcal{L}_B(z,b)=\|z-b\|^3.$$

where $\|.\|$ is entrywise vector norm. Now the total loss becomes $\mathcal{L}(.)=\mathcal{L}_S(.)+\alpha\mathcal{L}_B(.)$ where α is the binary loss weight (α=0.01). Since the sign(.) function has ambiguous gradient at zero, the gradient of b to z is bridged during backprop, that is $\partial\mathcal{L}/\partial z=\partial\mathcal{L}/\partial b$; after Discrete Proximal Linearized Minimization (DPLM). During inference, b is converted to $\{0,1\}^D$ as b:=(b+1)/2.

A second strategy involves post-process binarization using a 2-step product quantization (PQ) method:

$$b=Q(z):=q_1(z)+q_2(z-q_1(z)).$$

where $q_1(.)$ and $q_2(.)$ are coarse- and fine-level quantizers respectively. $q_1(.)$ uses k-means for fast and memory-efficient cluster assignment while $q_2(.)$ is a finer product quantizer encoding the residual vectors after $q_1(.)$. Some configurations can use 5K centroids for $q_1(.)$ and 8 sub-quantizers for $q_2(.)$ each encoding an 8 bit hash code.

The user interface (UI) module 116 of the visual search system 104 provides a user interface for submitting query images for searching the source image repository 124. For instance, the UI module 116 can provide a UI to a user device, such as the user device 102. The user device 102 can be any type of computing device, such as, for instance, a personal computer (PC), tablet computer, desktop computer, mobile device, or any other suitable device having one or more processors. As shown in FIG. 1, the user device 102 includes an application 108 for interacting with the visual search system 104. The application 108 can be, for instance, a web browser or a dedicated application for providing visual search functions, such as those described herein. The application 108 can present the UI provided by the UI module 116. The UI allows a query image to be submitted to the visual search system 104.

When a query image is received by the visual search system 104, the content fingerprint module 114 feeds the query image to the machine learning model 122 to generate a content fingerprint of the query image. The search module 118 queries the source image repository 124 using the content fingerprint of the query image. In some configurations, the search module 118 ranks the top-N source images based on a distance (e.g., L2 distance) between the content fingerprint for the source image and content fingerprints of the source images. In some cases, a strict approach can be taken such that the search module 118 only identifies a single source image with the closest distance.

As previously indicated, the machine learning module 120 is trained to be invariant to benign transformations but sensitive to manipulations. As such, in the case in which the query image corresponds with a source image with only benign transformations, the distance between the content fingerprint for the query image and the content fingerprint for the source image should be minimal such that the source image is highly ranked in the top-N source images, and ideally, the closest match. In the case in which the query image corresponds with a source image that has been manipulated, the distance between the content fingerprint for the query image and the content fingerprint for the source image should be such that the source image is not ranked within the top-N source images or ranked low in the top-N source images, thereby indicating a mismatch between the images.

In some configurations, as a second stage check, geometric verification (GV) is performed to compare the query image and one or more of the top-N source images, for instance, by starting with the top-ranked image and stopping when a threshold match is identified based on the GV. GV is performed by estimating the fundamental matrix under MLESAC (probabilistic RANSAC) from sparse SIFT correspondences established between two images. This typically results in fewer than 10-20 inliers for different images and several hundred (200-2000) inliers for similar images. Thresholding this score provides a robust indicator of relevance preferable to thresholding on the L2 embedding distance from the first stage. In the case in which the query image is a variant of a source image with benign transformations, the number of inliers will be above a threshold indicating a match. In the case in which the query image is a variant of a source image with manipulations and the source image is included in the top-N results, the number of inliers will be below the threshold. In that case, no matching source image is identified based on the search or the source image may be identified as a partial match, indicating that the query image is likely a manipulated variant of the source image.

As noted above, in the case in which a query image is a variant of a source image with manipulations, the corresponding source image may not be returned in the top-N ranked search results based on distance between content fingerprints from the machine learning model 122. Accordingly, in some embodiments, a secondary visual search can be performed using a different visual search approach, such as for instance, using a semantic search embedding learned using ResNet50 as a backbone, pre-trained using, for instance, ImageNet or using Adobe Stock tags. These types of visual searches are not sensitive to manipulations as in the case of content fingerprints from the machine learning model 122, and as such, these visual searches can identify source images for query images that comprise manipulated variants of the source images. GV can be performed on the query image and source image(s) returned by the second visual search to verify a source image as corresponding to the query image.

The UI module 116 provides a search result back to the user device 102 as a response to the query image. The search result can provide a variety of information in various configurations of the technology described herein. For instance, the search result can provide the source image identified from the visual search using the technology described herein and/or using the secondary visual search. Additionally, the search result can provide the provenance information for the returned source image.

The search result can further provide an indication of whether the query image has been manipulated. For instance, in the case in which there is minimal distance between the content fingerprints for the query image and the corresponding source image (e.g., the source image is a top-ranked result), the search result can provide an indication that the source image is a match. In the case in which there is a greater distance between the content fingerprints for the query image and the corresponding source image (e.g., the source image is lower ranked or not returned in the top-N results), the search result can provide an indication that the source image is a partial match with a warning, such as "The image may be manipulated."

Figure 3:
FIG. 3 includes images providing examples a difference image that illustrates differences between images and manipulated variants of the images.

In some configurations, the search result can provide a comparison of the query image and the source image returned to allow the user to visually check the two images. For instance, GV includes a side effect giving a set of robust correspondences to compute a homography between the image pair and so align and difference them for a final stage visual check by the user. By way of illustration, FIG. 3 provides three examples 302, 304, and 306 of difference images provided for query images and their corresponding source images. In each example, the query image includes a manipulation, as well as some benign transformations like padding or rotating the image. The difference image comprises a heat map showing manipulations between the source image and the query image. As can be seen from the examples in FIG. 3, the heatmap is sensitive to the manipulations while ignoring the benign transformations.

Example Methods for Content Fingerprinting and Visual Search

Figure 4:
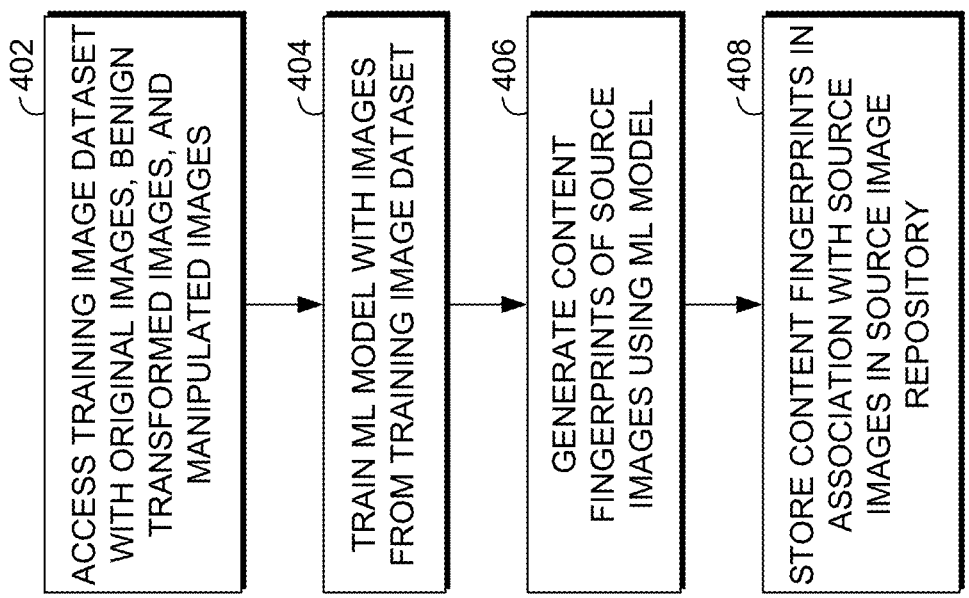
FIG. 4 is a flow diagram showing a method for training a machine learning model to generate content fingerprints of images that are invariant to benign transformations and sensitive to manipulations in accordance with some implementations of the present disclosure.

With reference now to FIG. 4, a flow diagram is provided that illustrates a method 400 for training a machine learning model to generate content fingerprints of images that are invariant to benign transformations and sensitive to manipulations. The method 400 may be performed, for instance, by the training module 110, scene graph module 112, and/or the content fingerprint module 114 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, a training image dataset is accessed. The training image dataset includes original images, benign transformed variants of the original images, and manipulated variants of the original images. In some cases, the manipulated variants may include benign transformations in addition to manipulations.

A machine learning model is trained on the images from the training image dataset, as shown at block 404. To enable the machine learning model to provide content fingerprints that are invariant to benign transformations and sensitive to manipulations, the machine learning model can be trained using a loss function that minimizes distances between original images and benign transformed variants of the original images while increase distances between original images and manipulated variants of the original images.

As discussed herein above, in configurations using a global approach, the machine learning model is trained on whole images. In configurations using an object-centric approach, the machine learning model is trained on a scene graph representations of images generated, for instance, using the method 500 of FIG. 5 discussed below. In the case of an object-centric approach, the machine learning model may be a GCN.

The trained machine learning model is used to generate content fingerprints of source images, as shown in block 406. In configurations using a global approach, each source image is fed to the machine learning model as a whole to generate content fingerprints for the source images. In configurations using an object-centric approach, a scene graph representation of each source image is generated and fed to the machine learning model to generate content fingerprints for the source images.

The content fingerprints for the source images are stored in association with corresponding sources images in the source image repository, as shown at block 408. This facilitates performing a visual search on the source image repository. In some configurations, each source image in the source image repository includes metadata, including provenance information for the source image.

Figure 5:
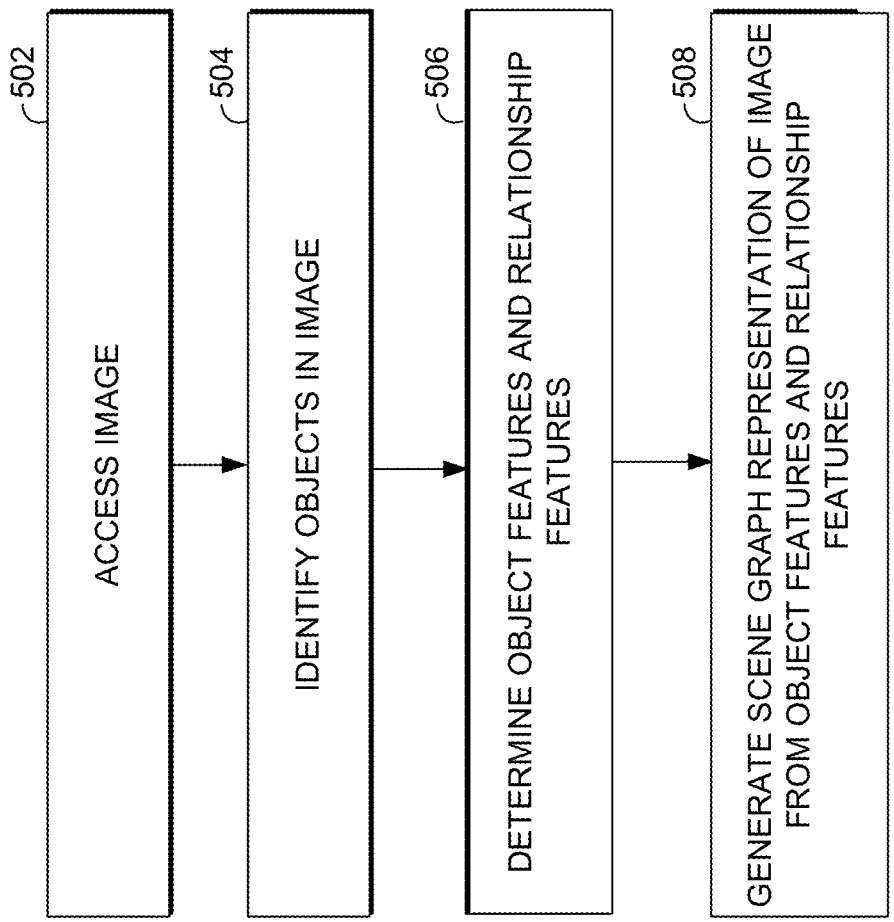
FIG. 5 is a flow diagram showing a method for generating a scene graph representation of an image in accordance with some implementations of the present disclosure.

Turning next to FIG. 5, a flow diagram is provided that shows a method 500 for generating a scene graph representation of an image. The method 500 can be performed, for instance, by the scene graph module 112 of FIG. 1. As shown at block 502, an image is accessed. Objects in the image are identified, as shown at block 504. The image can be decomposed into its constituent objects, for instance, using an object detector, such as Mask-RCNN.

Object features for each object and relationship features for relationships between object pairs are determined at block 506. In some configurations, three object features are employed, including a visual appearance feature, a shape feature, and a geometry feature. It should be understood, however, that any number of different features describing each object can be employed. The relationship features represent geometric relationships between pairs of objects. A scene graph representation of the image is generated at block 508 from the object features and relationship features.

Figure 6:
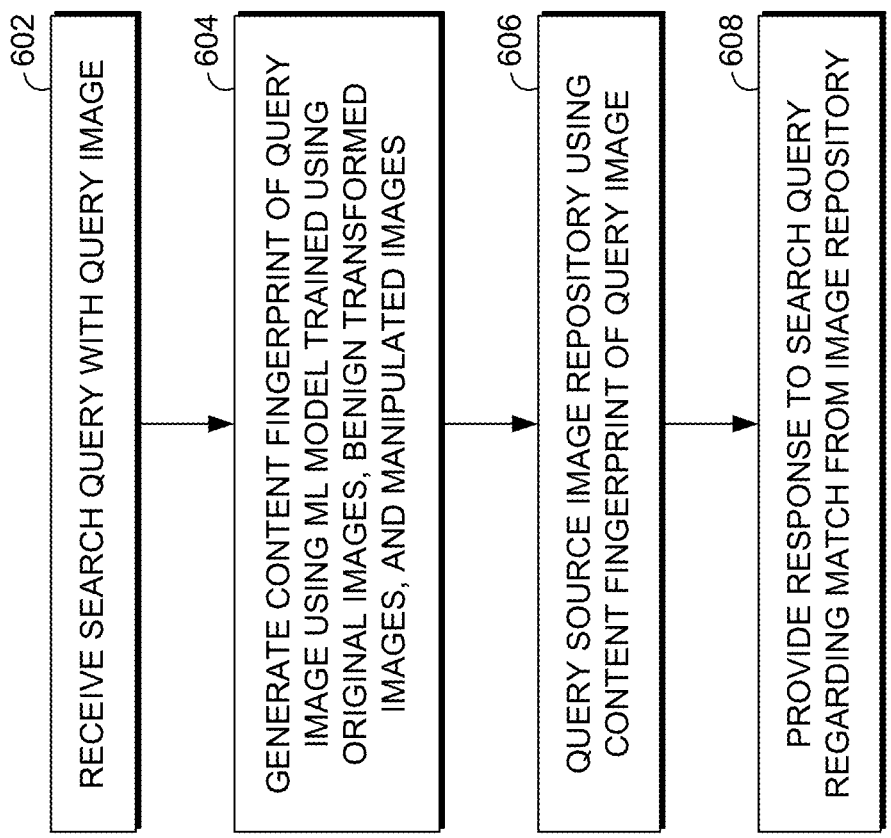
FIG. 6 is a flow diagram showing a method for performing a visual search in accordance with some implementations of the present disclosure.

With reference now to FIG. 6, a flow diagram is provided showing a method 600 for performing a visual search. The method 600 can be performed, for instance, by the scene graph module 112, the content fingerprint module 114, the UI module 116, and/or the search module 118. As shown at block 602, a search query with a query image is received. A content fingerprint for the query image is generated by feeding the query image to a machine learning model, as shown at block 604. The machine learning model has been trained on a training image dataset that includes original images, benign transformed variants of the original images, and manipulated variants of the original images (e.g., using the method 400 of FIG. 4).

In configurations using a global approach, the query image is fed to the machine learning model as a whole image. In configurations using an object-centric approach, a scene graph representation of the query image is generated (e.g., using the method 500 of FIG. 5), and the scene graph representation of the query image is fed to the machine learning model.

A source image repository is queried using the content fingerprint of the query image, as shown at block 606. The source image repository includes source images with metadata, such as provenance information, as well as a content fingerprint generated for each source image using the machine learning model. The query may include ranking the top-N source images based on distance (e.g., L2 distance) between the content fingerprint of the query image and the content fingerprint of the source images. In some configurations, N may be one, such that only the source image with the shortest distance is identified.

A response to the search query is returned, as shown at block 608. The response may include information regarding whether a matching source image was identified. If a matching source image was identified, the response may include the matching source image, provenance information, and an indication regarding the whether the matching source image is a partial match (indicative of the query image having been manipulated). In some configurations, additional steps may be performed to formulate the response. For instance, GV may be employed to compare the query image to sources images returned from the query image to verify a source image as a sufficient match. Additionally, a secondary search can be performed with another search technique, for instance in the event that none of the top-N images returned from the query match the query image. The response may further include a difference image, such as a heatmap, generated to demonstrate differences between the query image and the matching source image.

Performance Evaluation

The performance of machine learning models generated using the object-centric content fingerprinting approach and the global content fingerprinting approach described herein was compared against 6 classical and 10 deep baselines.

Several datasets were employed for the evaluation:

PSBattles24K. The models were trained and evaluated on a corpus of user-generated manipulated images. The raw dataset has 11 k original and 90 k manipulated variants of those images. To increase the challenge of this dataset, paired images were sorted by ImageNet distance (ResNet50/ImageNet) between the original and manipulated variant, and lower quartile retained. After duplicate removal, 7 K originals and 24 K manipulated variants remain. The dataset is split into distinct train and test sets, consisting 21 k and 3 k pairs of original-manipulated images respectively. 5% of the training set (approx. 1200 pairs) is set aside for validation. Further, we create a test set of 150K images (50 random transformations per original image in the test set) to evaluate invariance to benign transformations.

PSBattles360K-S. The robustness of the models toward individual augmentations is tested using further two test sets of 10 randomized augmentations applied to each original image within PSBattles24K. The first set (resp. second set) contains images from 6 seen (resp. unseen) benign transformations. The unseen augmentations are 6 noise sources common in photography—shot noise, impulse noise, speckle noise, Gaussian blur, defocus blur and pixelate. Each set has in total 180K (3K×10×6) images.

Stock4.7M is a diverse, unannotated corpus of images used to evaluate retrieval performance in the presence of largescale distractors. The dataset was created by scraping public, unwatermarked image thumbnails from the Adobe Stock website yielding approx. 4:76M images at VGA resolution. Combined with PSBattles24K this enables to scale evaluation to a test corpus of about 5M images.

The following describes benchmarks and evaluation metrics used:

Benchmark I considers a query set of the 3K original images, and a search corpus comprising the 3K manipulated images and the 150K benign transformed variants of those images, in addition to 100K distractors from Stock4.7M. The purpose of Benchmark I is to evaluate the capability of the embedding to discriminate manipulated from benign content. Given an original image as the query, it is desirable to retrieve all benign augmentations and reduce the ranking of any manipulated imagery in the returned results. To this end, a masked Mean Average Precision (mmAP) was used for benchmark I. For a single query q;

$$mmAP_q = \frac{\sum_k r_q(k) m_q(k) P_q(k)}{\sum_k r_q(k)}.$$

where $P_q(k)$ is precision at k, $r_q(k)=1$ if the $k^{th}$ retrieval is relevant otherwise 0, $m_q(k)=1$ if the manipulated image is ranked below k otherwise 0. mmAP thus penalizes early ranking of manipulated images, by computing standard mAP, up to but excluding the first manipulated result. mmAP achieves an upper bound of 1 if all benign images are returned ahead of any irrelevant images. In scalability experiments where all Stock4.7M distractors are included in the search corpus, computing full mmAP is not feasible. Therefore mmAP@R was used instead; $mmAP_q$ is computed on top R retrieval results only, where R is number of images relevant to query q in the database.

Hash, DFH, DSDH, DBDH and CSQ. These models were trained using publicly available code.

Table 1 reports the performance of the models using the technology described herein (GCN and Global CNN) and the baselines on the PSBattles24K test set with 100K distractor images, across both benchmark sets. As can be seen from the table, the models using the technology described herein outperform the baselines on both benchmarks. This is the case when compared like-for-like (64 bit hash) or using offline (PQ) hashing, or no hashing at all. The baseline methods underperform at discriminating manipulated images from the benign variants.

TABLE 1

|  | | Benchmark I | | Benchmark II | | | | | |
|---|---|---|---|---|---|---|---|---|---|
|  | Method | mAP | mmAP | mAP | $\overline{mAP}$ | $F_{mAP}$ | R@1 | $\overline{R@1}$ | $F_{R1}$ |
| Proposed | GCN† | 0.9537 | 0.8384 | 0.8708 | 0.7003 | 0.3881 | 0.7878 | 0.7791 | 0.3917 |
|  | GCN* | 0.8305 | 0.7438 | 0.8057 | 0.7485 | 0.388 | 0.7334 | 0.7889 | 0.3801 |
|  | GCN | 0.8807 | 0.7111 | 0.7682 | 0.6929 | 0.3643 | 0.6544 | 0.772 | 0.3542 |
|  | Global CNN† | 0.9898 | 0.8707 | 0.9848 | 0.4877 | 0.3262 | 0.9736 | 0.5581 | 0.3548 |
|  | Global CNN* | 0.9408 | 0.8103 | 0.9525 | 0.5395 | 0.3444 | 0.9432 | 0.5781 | 0.3584 |
|  | Global CNN | 0.798 | 0.6086 | 0.6924 | 0.7142 | 0.3516 | 0.5639 | 0.8003 | 0.3308 |
| Deep | GreedyHash | 0.6635 | 0.3456 | 0.5893 | 0.3957 | 0.2367 | 0.4932 | 0.4784 | 0.2428 |
|  | HashNet | 0.8093 | 0.4031 | 0.7354 | 0.2837 | 0.2047 | 0.6291 | 0.3736 | 0.2344 |
|  | CSQ | 0.5785 | 0.2838 | 0.5104 | 0.4545 | 0.2404 | 0.4291 | 0.5226 | 0.2356 |
|  | DFH | 0.3207 | 0.1595 | 0.3107 | 0.6657 | 0.2118 | 0.247 | 0.7247 | 0.1842 |
|  | DBDH | 0.6908 | 0.3339 | 0.5889 | 0.3508 | 0.2199 | 0.4818 | 0.4287 | 0.2268 |
|  | DSDH | 0.6958 | 0.328 | 0.5878 | 0.3214 | 0.2078 | 0.4693 | 0.4091 | 0.2186 |
|  | ADSH | 0.3339 | 0.1887 | 0.2458 | 0.6112 | 0.1753 | 0.1578 | 0.7041 | 0.1289 |
|  | DPSH | 0.8202 | 0.3917 | 0.8003 | 0.2197 | 0.1724 | 0.7159 | 0.2936 | 0.2082 |
|  | DSH | 0.2416 | 0.1358 | 0.1962 | 0.7523 | 0.1556 | 0.1318 | 0.8274 | 0.1137 |
|  | MIN | 0.1803 | 0.0898 | 0.1737 | 0.7396 | 0.1407 | 0.1291 | 0.7851 | 0.1108 |
| Classical | wHash | 0.5338 | 0.2274 | 0.4981 | 0.1132 | 0.0922 | 0.4652 | 0.1372 | 0.1059 |
|  | aHash | 0.5764 | 0.2668 | 0.5231 | 0.1114 | 0.0919 | 0.4892 | 0.1382 | 0.1077 |
|  | pHash | 0.6008 | 0.326 | 0.5515 | 0.0918 | 0.0787 | 0.5203 | 0.1196 | 0.0972 |
|  | ISCC | 0.6003 | 0.3252 | 0.5506 | 0.0918 | 0.0787 | 0.5186 | 0.1189 | 0.0967 |
|  | dHash | 0.6164 | 0.289 | 0.5363 | 0.0681 | 0.0604 | 0.4993 | 0.0818 | 0.0703 |
|  | cHash | 0.2509 | 0.1018 | 0.2866 | 0.5601 | 0.1896 | 0.2284 | 0.6264 | 0.1674 |

(methods with *indicate 64-bit hashing via PQ; †indicates no hashing)

Benchmark II is aligned closely with the image attribution use case, where the test corpus contains the original images (e.g. a database of images with associated provenance information) plus Stock4.7M distractors, and the query set comprises benign and manipulated variants of those originals. An ideal model would rank an original highly when querying with a benign transformed version, and rank it low for manipulated queries. Standard mAP is reported for benign queries, and $\overline{mAP}=1-mAP$ for manipulated queries. Similarly, we report recall at top-1 R@ 1 for benign queries, and $\overline{R@1}=1-R@$ 1 for manipulated queries. $F_{R1}$ score is used to measure the trade-off:

$$F_{R1} = R@1 \times \overline{R@1}/(R@1 + \overline{R@1}).$$

$F_{mAp}$ is reported in the same manner, computed over mAP.

A object-centric model and global model (GCN, Global CNN) developed with the technology described herein were compared against methods in two baseline categories:

Classical Methods. A set of 6 statistical methods for perceptual hashing. Five methods (D-ifference Hash, P-erception Hash, A-verage Hash, W-aveless Hash and C-*olor* Hash) via public implementations, and also ISCC, an ISO standard proposal similar to pHash. All methods produce 64-bit hash codes.

Deep Hashing Methods. A set of deep supervised hashing approaches: DPSH, Hash-Net, DSH, DHN, ADSH, Greedy- Exemplary Operating Environment Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:

accessing a training image dataset comprising a plurality of original images, one or more positive images for each original image, and one or more negative images for each original image, the one or more positive images for each original image consisting of one or more benign transformed images that each comprises one or more benign transformations to a corresponding original image reformatting the corresponding original image and no manipulation changing a salient detail impacting a meaning of the corresponding original image, the one or more negative images for each original image comprising one or more manipulated images that each comprises one or more manipulations to a corresponding original image changing a salient detail impacting a meaning of the corresponding original image; and training a machine learning model to learn an embedding using the images from the training image dataset and a loss function that minimizes a distance in an embedding space between a representation for each original image and a representation for the one or more benign transformed images corresponding to each original image while increasing a distance in the embedding space between the representation for each original image and a representation for the one or more manipulated images corresponding to each original image.

2. The one or more computer storage media of claim 1, the operations further comprising:

generating a scene graph representation of each image from the training image dataset; and wherein the machine learning model is trained using the scene graph representation of each image from the training image dataset.

3. The one or more computer storage media of claim 2, wherein generating the scene graph representation for a first image from the training image dataset comprises:

identifying a plurality of objects in the first image;

determining one or more object features for each object in the first image and one or more relationship features for a relationship between each pair of objects; and generating the scene graph representation for the first image based on the one or more object features and the one or more relationship features.

4. The one or more computer storage media of claim 3, wherein the one or more object features for each object in the first image comprise a visual appearance feature, a shape feature, and a geometric feature.

5. The one or more computer storage media of claim 1, the operations further comprising:

generating a content fingerprint for each of a plurality of source images using the machine learning model; and storing each content fingerprint in association with a corresponding source image in an image repository.

6. The one or more computer storage media of claim 5, wherein the image repository stores provenance information in association with each source image.

7. The one or more computer storage media of claim 5, the operations further comprising:

receiving a search request comprising a query image;

generating a content fingerprint of the query image using the machine learning model; and searching the image repository by determining a distance in the embedding space between the content fingerprint for the query image and the content fingerprint for one or more source images.

8. A computerized method comprising:

receiving, by a user interface module, a search request comprising a query image;

generating, via a machine learning model, a content fingerprint for the query image, the machine learning model trained using a training image dataset and a loss function, the training image dataset comprising a plurality of original images, one or more positive images for each original image, and one or more negative images for each original image, the one or more positive images for each original image consisting of one or more benign transformed images that each comprises one or more image benign transformations to a corresponding original image reformatting the corresponding original image and no manipulation changing a salient detail impacting a meaning of the corresponding original image, the one or more negative images comprising one or more manipulated images that each comprises one or more manipulations to a corresponding original image changing a salient detail impacting a meaning of the corresponding original image, the loss function minimizing a distance in an embedding space between a representation for each original image and a representation for the one or more benign transformed images corresponding to each original image while increasing a distance in the embedding space between the representation for each original image and a representation for the one or more manipulated images corresponding to each original image;

searching, by a search module, an image repository using the content fingerprint, the image repository comprising a plurality of source images associated with a content fingerprint generated using the machine learning model; and providing, by the user interface module, a response to the search query based on the searching.

9. The computerized method of claim 8, wherein generating the content fingerprint for the query image comprises:

identifying a plurality of objects in the query image;

determining one or more object features for each object in the query image and one or more relationship features for a relationship between each pair of objects;

generating a scene graph representation for the query image based on the one or more object features and the one or more relationship features; and feeding the scene graph representation to the machine learning model.

10. The computerized method of claim 8, wherein the searching identifies a matching source image from the image repository, and the response identifies the matching source image.

11. The computerized method of claim 10, wherein the image repository stores provenance information in association with each source image, and the response includes the provenance information for the matching source image.

12. The computerized method of claim 8, wherein the searching does not identify a matching source image from the image repository, and the response includes an indication that a matching source image was not found.

13. The computerized method of claim 8, wherein the searching does not identify a matching source image from the image repository, and the method further comprises:

identifying a first source image from the image repository by performing a second search using a second visual search approach; and wherein the response identifies the first source image.

14. The computerized method of claim 13, wherein the response includes an indication that the query image may be a manipulated version of the first source image.

15. The computerized method of claim 13, wherein the response includes a user interface element for comparing visual aspects of the query image and the first source image.

16. A computer system comprising:

a processor; and a computer storage medium storing computer-useable instructions that, when used by the processor, causes the computer system to perform operations comprising:

training, by a training module, a machine learning model using a training image dataset and a loss function, the training image dataset including a plurality of original images, one or more positive images for each original image, and one or more negative images for each original image, the one or more positive images for each original image consisting of one or more benign transformed images that each comprises one or more benign transformations to a corresponding original image reformatting the corresponding original image and no manipulation changing a salient detail impacting a meaning of the corresponding original image, the one or more negative images comprising one or more manipulated images that each comprises one or more manipulations to a corresponding original image changing a salient detail impacting a meaning of the corresponding original image, the loss function minimizing a distance in an embedding space between representations of the original images and corresponding benign transformed images and increasing a distance in the embedding space between representations of the original images and corresponding manipulated images;

storing, in an image repository, a content fingerprint generated for each of a plurality of source images using the machine learning model;

in response to receiving a query image, generating, by a content fingerprint module, a content fingerprint of the query image using the machine learning model;

searching, by a searching module, the image repository using the content fingerprint of the query image; and returning, by a user interface module, a response to the query image based on the searching.

17. The computer system of claim 16, wherein the machine learning model is trained using scene graph representations of images from the training image dataset, the scene graph representation of a first image from the training image dataset generated by:
- identifying a plurality of objects in the first image;
- determining one or more object features for each object in the first image and one or more relationship features for a relationship between each pair of objects; and
- generating the scene graph representation for the first image based on the one or more object features and the one or more relationship features.

18. The computer system of claim 17, wherein the content fingerprint of each source image is generated using a scene graph representation of the source image.

19. The computer system of claim 18, wherein the content fingerprint of the query image is generated using a scene graph representation of the query image.

20. The computer system of claim 16, wherein in response to the searching not identifying a matching source image for the query image, the operations further comprising:
- performing a second search of the image repository using a second search method to identify a matching source image,
- wherein the search result indicates the matching source image as a partial match and the query image may be a manipulated variant of the matching source image.

* * * * *